(12) United States Patent
Bichsel et al.

(10) Patent No.: US 8,667,287 B2
(45) Date of Patent: *Mar. 4, 2014

(54) TRANSACTION AUDITING FOR DATA SECURITY DEVICES

(75) Inventors: Patrik Bichsel, Zurich (CH); Jan L. Camenisch, Thalwil (CH); Thomas R. Gross, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,985

(22) Filed: Sep. 13, 2012

(65) Prior Publication Data

US 2013/0024694 A1    Jan. 24, 2013

Related U.S. Application Data

(63) Continuation of application No. 13/580,222, filed as application No. PCT/IB2011/050638 on Feb. 16, 2011.

(30) Foreign Application Priority Data

Feb. 26, 2010 (EP) ..................................... 10154826

(51) Int. Cl.
*G06F 21/00* (2013.01)
(52) U.S. Cl.
USPC ........................................... 713/172; 705/50
(58) Field of Classification Search
USPC .......................................... 713/172; 705/50
See application file for complete search history.

(56) References Cited

U.S. PATENT DOCUMENTS

| 6,055,512 | A | 4/2000 | Dean et al. |
| 6,913,193 | B1* | 7/2005 | Kawan .......................... 235/380 |
| 2007/0124589 | A1 | 5/2007 | Sutton et al. |
| 2008/0098230 | A1* | 4/2008 | Kalibjian et al. ............. 713/176 |
| 2011/0307703 | A1* | 12/2011 | Ogg et al. ..................... 713/176 |

OTHER PUBLICATIONS

Bichsel et al., "Anonymous Credentials on a Standard Java Card", Nov. 2009, CCS, pp. 600-610.*
International Search Report, PCT/IB2011/050638, mailed Jun. 29, 2011.

* cited by examiner

*Primary Examiner* — Matthew Smithers
(74) *Attorney, Agent, or Firm* — Scully, Scott, Murphy & Presser, P.C.; Jennifer Davis, Esq.

(57) ABSTRACT

Data security devices are provided which store user data and interact with terminal devices to provide information about the stored user data. Security device has memory for storing user data, an interface for transmission of data communications connectable to a data communications network, and a controller. The controller processes a request from the terminal device for information about said user data by first generating a message. The message is generated to permit verification, using secret data, that the message was generated by the controller. The controller sends the message to the terminal device for communication to a publication entity for publication of the message. The controller then receives from the terminal device a cryptographic construction. The controller checks validity of the cryptographic construction for said message, and subsequent supply of the information requested about the user data to the terminal device is then dependent on said cryptographic construction.

8 Claims, 4 Drawing Sheets

| Card 5 | Terminal 2 | BB 4 |
|---|---|---|
| | get time τ | |
| (a) | ← p, τ | |
| (b) choose c<br>γ = $E_{pkC}(p)$<br>δ = $E_{pkBB}(c)$ | | |
| (c) | δ, γ → | |
| (d) | connect to BB<br>δ, γ, τ → | |
| | | c = $E^{-1}_{skBB}(δ)$<br>publish (τ, c, γ)<br>σ = $S_{skBB}(τ, c, γ)$ |
| (e) | ← σ | |
| (f) | σ → forward | |
| (g) $V_{pkBB}(σ, p, c, τ)$ | | |
| (h) proof = PK(p)<br>or<br>refuse | proof → | |

TRANSACTION AUDITING FOR DATA SECURITY DEVICES

CROSS REFERENCE TO RELATED APPLICATION

This application is a continuation application of U.S. patent application Ser. No. 13/580,222, filed on Aug. 21, 2012 which is a National Phase of PCT/IB2011/050638 filed on Feb. 16, 2011 which claims the benefit of priority of European Patent Application EP 10154826.1 filed on Feb. 26, 2010, the entire content and disclosure of which is incorporated herein by reference.

BACKGROUND OF THE INVENTION

1. Field of the Invention

This invention relates generally to transaction auditing for data security devices of the type which store user data and can interact with terminal devices to provide information about the stored user data to the terminal devices. Data security devices enabling reliable auditing of these transactions are provided, as well as terminal devices for use with such security devices, systems employing these devices, and computer programs for controlling operation of such devices.

2. Description of the Related Art

There are numerous scenarios in which a user needs to prove certain information in order to access some resource. This information is often security-sensitive in that it may be secret, private, personal or otherwise deemed worthy of protection against unauthorised disclosure. Such information can be stored as user data in memory of a data security device which is adapted to interact with a terminal device. The security device can provide information about the stored user data to the terminal device so as to prove whatever information is required in order to access the resource in question. On successful proof, the terminal device permits user access to the resource.

A smart card is a common form factor for such a data security device. Examples include electronic identity (eID) cards, credit cards, healthcare and insurance cards. The user data stored on the card is typically protected in some way, e.g. by a cryptographic encoding process, both to protect against unauthorised access and to provide assurance of validity. In particular, user data is commonly encoded in a cryptographic construction, in particular some form of cryptographic credential, which is issued by a trusted authority who has verified the information represented by the user data. In an attribute-based system for instance, items of user information are represented by values assigned to predefined "attributes", these being defined according to the information to be proved, for example specifying city of birth, age, profession, hair colour, and so on. The attribute values can be encoded as user data in the credential to certify the correctness of the information represented. For security purposes, credential systems are ideally designed so that proofs can be made about stored user data without revealing anything other than that which is to be proved. Hence, a terminal device requesting proof of some particular information about the stored user data can obtain the required proof without learning anything else about the user data.

When interacting with a data security device, the terminal device sends the security device a request specifying the information required about the stored user data. In attribute-based systems, for example, this specification, or "policy", indicates any attribute values which need to be disclosed and/or what needs to be proved about particular attribute values. The security device then engages with the terminal in a cryptographic proof demonstrating possession of a valid credential certifying user attributes satisfying the policy.

Reliable auditing of the information exchanges between a terminal and security device is problematical. In particular, it is desirable for a user to be able to check the information which is requested by terminals in his various transactions, but obtaining reliable audit information for this purpose is not straightforward. Various factors contribute to this problem. For example, typical data security devices, like smart cards, generally do not have their own user interface. Hence, these devices cannot display audit information to the user transaction by transaction. While terminal devices usually do provide a user interface, these devices are generally untrusted and so cannot be relied on by the user to present audit information honestly. In particular, an untrusted terminal might ask the security device many questions about its user data without informing the user about these interactions. The terminal might then be able to infer confidential user data from all these transactions. For example, if a security device offers proof of age by age range (e.g. "I'm older than 18", or "I'm younger than 16", etc), then the terminal might infer the actual certified age of the user, or even the actual date of birth, from many requests with different age policies. Without a user interface of its own the security device cannot inform the user directly of this misuse.

Another difficulty is that persistent memory in data security devices like smart cards has limited re-writability. This makes it impractical for the security device to record its own audit trail of the user's transactions. For example, the EEPROM (electrically erasable programmable read only memory) employed in current eID cards is limited to of the order of 10,000 write operations (due to wear-out caused by inherent erase cycles). In fact, eID card functionality ideally avoids write operations to EEPROM wherever possible. This is partly because the cards are designed to refuse service completely if even a single EEPROM cell is broken, and there have been cases in which eID cards have expired much too early due to excessive write operations.

Volatile memory in a data security device may of course record details of terminal abuse involving multiple undisclosed requests. However, as the device's volatile state is deleted with each power loss, the terminal can reset the volatile state of the device and so delete even the volatile record of misuse.

It will be seen from the above that data security devices tend to be at the mercy of the terminal device as far as audit information is concerned, and are consequently vulnerable to multiple-request attacks of which the user is oblivious. This fundamental limitation is particularly significant if the security device can respond in multiple ways to terminal requests, with each response disclosing additional information about the user. A terminal can then escalate its knowledge about the user by asking many undisclosed questions. It has been proposed to certify terminal devices such that they are only allowed to request certain attributes. However, this only restricts the attribute space in which the terminal operates and does not prevent the terminal from escalating its knowledge to the boundaries of this space, even if the broader transaction actually required much less knowledge. Another option is to use trusted terminals, or trusted hardware devices for monitoring terminal operation, which incorporate a trusted user display and input.

BRIEF SUMMARY OF THE INVENTION

One embodiment of an aspect of the present invention provides a data security device comprising memory for storing user data, an interface for transmission of data communications between the security device and a terminal device connectable to a data communications network, and a controller for processing requests from the terminal device for information about said user data. The controller is adapted to process a said request by:

generating a message comprising an indication of the information requested about the user data, the message being generated so as to permit verification, using secret data, that the message was generated by the controller;

sending the message to the terminal device for communication via said network to a publication entity for publication of the message in the network;

receiving from the terminal device a cryptographic construction, issued by the publication entity, encoding the message published by the publication entity;

checking validity of the cryptographic construction for said message generated by the controller; and supplying the information requested about the user data to the terminal device in dependence on said cryptographic construction.

In security devices embodying this invention, therefore, the controller responds to a request for information about stored user data by generating a message which comprises an indication of the information requested. This message is generated in such a manner as to permit subsequent verification of authorship, i.e. that the message was indeed generated by that controller. This verification process may require use of secret data, typically stored in the security device itself, but which in any case is "secret" in the sense that this data is only available to the authorized party (or possibly parties) permitted to see audit information for the security device. Usually the only authorized party will be the user of the security device itself. The resulting message is sent to the terminal device and relayed via the network to a publication entity. This entity publishes the message in the network and generates a cryptographic construction encoding the published message. Such a cryptographic construction may be generated in a variety of ways by encoding the published message in accordance with a cryptographic encoding process, e.g. using a cryptographic signature algorithm. The cryptographic construction issued by the publication entity is returned via the terminal to the security device. The device controller can then verify whether the cryptographic construction is valid for the originally-generated message (i.e. that the construction is a valid encoding of the original message). If so, this confirms that the original message has indeed been published. Validity of the cryptographic construction is thus checked before the originally-requested information is actually sent to the terminal, subsequent supply of information to the terminal being dependent on the cryptographic construction.

In this way, the security device can ensure that a published record exists of the information requested by a terminal device before that information is actually supplied to the terminal device. Hence, the availability of a reliable audit trail of the device's transactions can be ensured a priori. The user can therefore check the published audit trail subsequently to confirm that no more information was requested than that disclosed by the terminal device. Moreover, since verification of authorship of published messages requires the secret data discussed above, no unauthorised party can verify which messages originated from that particular security device. The user's audit trail can thus be made anonymous. Security devices embodying this invention may thus provide an elegantly simple, eminently practical and highly efficient system for establishing reliable audit trails for information supplied to terminal devices. This system may not prevent individual instances of abuse by rogue terminals making multiple-request attacks. However, the system may provide an effective fraud-detection mechanism, allowing rogue terminals and terminal owners to be quickly identified, thereby preventing sustained abuse and acting as an effective deterrent.

Having checked validity of the cryptographic construction for the originally-generated message, the controller may supply the information requested about the user data to the terminal in dependence on the cryptographic construction, e.g. in dependence on validity of the construction and/or in dependence on information in the construction. In preferred embodiments, the controller is adapted to supply the information requested about the user data to the terminal device only if the construction is valid for the originally-generated message. Alternatives might be envisaged, however. For instance, embodiments might be envisaged where, if the message encoded in the construction is found to be different to the originally-generated message, the controller supplies only certain information to the terminal, e.g. some predetermined minimal information or such information as is indicated as requested by the terminal device in the message encoded in the construction (if this is a lesser subset of the information actually requested). When a valid construction is not received for a request, the controller could in general limit the information which can be supplied, or the number of requests which will be serviced, or could on this occasion record transaction details in persistent storage (thought this solution will usually be undesirable for the reasons discussed above). For most secure and efficient operation, supply of user information will be dependent on receipt of a valid cryptographic construction.

The message generated by the security device may include any convenient indication of the information requested by the terminal device. This indication can conveniently be the policy (or similar specification) which was included in the request from the terminal device, but in general any specification, definition, description or other indication by which the requested information can be identified may be used.

Generation of the message to permit verification of authorship can be achieved in a variety of ways. In particular, various cryptographic message generation processes might be employed to permit verification of authorship using secret data which is associated somehow with the message generation process. For example, the message generation process may involve a cryptographic encryption process such that successful decryption requires a secret key, and/or inclusion of some specific element(s) generated using a secret value or values such that knowledge of the secret value(s) permits subsequent identification of messages so generated. In preferred embodiments, the controller is adapted to generate the message by encrypting said indication of the information requested about the user data to produce a ciphertext which is decryptable using a secret user key. A key-anonymous encryption algorithm is used by preferred embodiments for this, whereby published messages can be not only anonymous but also unlinkable by anyone other than the holder of the secret user key. The message generation can also involve additional processes in preferred embodiments, whereby a message may include other elements as well as the aforementioned ciphertext. In particular, the controller is preferably adapted to compute, for each message generated by the controller, a cryptographic challenge to facilitate verification that the message was generated by the controller and to include the cryptographic challenge in that message. Such a challenge is ideally encrypted so that only the authorized publication entity can decrypt the challenge included in a message.

In particularly preferred embodiments, the controller is adapted to compute the cryptographic challenge for a message using (at least) a random number for that message and a predetermined secret value so as to permit verification using said secret value that the message was generated by the controller without intervening storage by the device of any message-specific data. The random number is used to ensure unlinkability of published messages while the secret value enables authorship verification. In this way, unlinkability can be assured and at the same time no write operations are required to persistent storage in the security device. In particular, for the subsequent verification process to work, the security device does not need to store the challenge, or the particular random number used, or indeed any other message-specific data which would require use of persistent storage for each message. Detailed examples of such techniques will be given below.

Scenarios might be envisaged where the review of published messages, and hence verification of which messages emanated from a given security device, is performed by some trusted terminal device which itself holds (or obtains from the security device) the required secret data. Most conveniently, however, this process can be performed by the controller of the security device. Hence, the controller is preferably adapted to perform an audit process comprising: receiving via a said terminal device message data from messages published by the publication entity in the network; identifying from said message data any message generated by the controller among the published messages corresponding to said message data; and for each message so identified, sending to the terminal device for output to a user a description of the information requested about the user data corresponding to said indication in that message. In general, the aforementioned message data may consist of the entire message or whatever message content is required to identify message authorship. The description of information output to the user may be the indication as included in the message or may be some other representation of the information in question.

An embodiment of a second aspect of the invention provides a terminal device comprising a communications interface for communication of data between the terminal device and a data communications network, a security device interface for communication of data between the terminal device and a data security device having memory storing user data, and a terminal controller for sending requests to the data security device for information about said user data. The terminal controller is adapted, before receiving information about the user data requested in a said request sent to the security device, to:

receive a message from the security device in response to the request sent to the security device;

send the message via said data communications network to a publication entity for publication of the message in the network;

receive from the publication entity a cryptographic construction, issued by the publication entity, encoding the message published by the publication entity; and to send the cryptographic construction to the security device.

Respective embodiments of further aspects of the invention provide computer programs comprising program code means for controlling operation of a security device according to embodiments of the first aspect of the invention and a terminal device according to embodiments of the second aspect of the invention. A computer program embodying the invention may constitute an independent program or may be an element of a larger program, and may be supplied, for example, embodied in a computer-readable medium such as a disk or an electronic transmission for loading in a device. The program code means of the computer program may comprise any expression, in any language, code or notation, of a set of instructions intended to cause a computer to perform the method in question, either directly or after either or both of (a) conversion to another language, code or notation, and (b) reproduction in a different material form.

An embodiment of another aspect of the invention provides a system comprising:

a terminal device according to the second aspect of the invention which is connectable to a data communications network;

a data security device according to the first aspect of the invention for processing requests from the terminal device for information about said user data; and a publication entity connected to said network for communication of data with the terminal device, the publication entity being adapted to receive a said message from the terminal device via the network, to a publish the message in the network, to generate a cryptographic construction encoding the published message, and to send the cryptographic construction to the terminal device.

In general, the publication entity may be any device, system or mechanism which can publish messages in the network in the sense of making the messages available for access by devices connecting to the entity via the network. Conveniently, the publication entity is adapted to operate a bulletin board for publication of said messages.

In general, where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which.

DETAILED DESCRIPTION OF THE INVENTION

Figure 1:
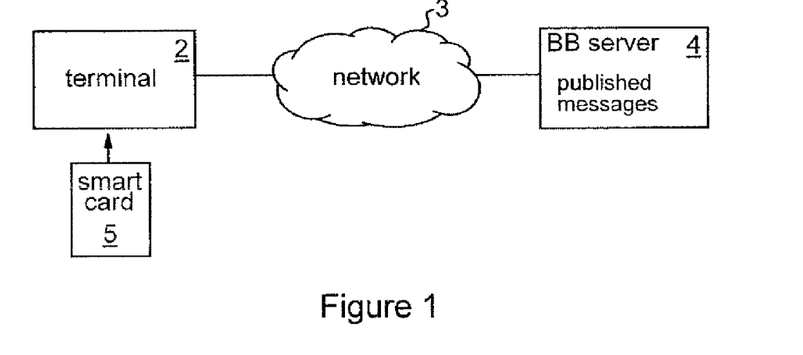
FIG. 1 is a schematic representation of a data communications system embodying the invention.

FIG. 1 shows a data communications system 1 embodying the invention. The system 1 includes a terminal device 2 which is connectable to a data communications network 3 for communication with other devices via the network. Network 3 may in general comprise one or more component networks or internetworks, including the Internet. System 1 also includes a publication entity represented here by server 4 which is connected to network 3. Server 4 provides a trusted bulletin board (BB) service to network 3 as discussed further below. (Although indicated as a single block here, in general the functionality of server 4 could be distributed over a plurality of physical machines of a server system). A data security device in the form of smart card 5 can interact with terminal device 2 in the system. The smart card 5 incorporates an embedded chip (not shown as such) containing user data relating to the holder of the card (the "user").

Figure 2:
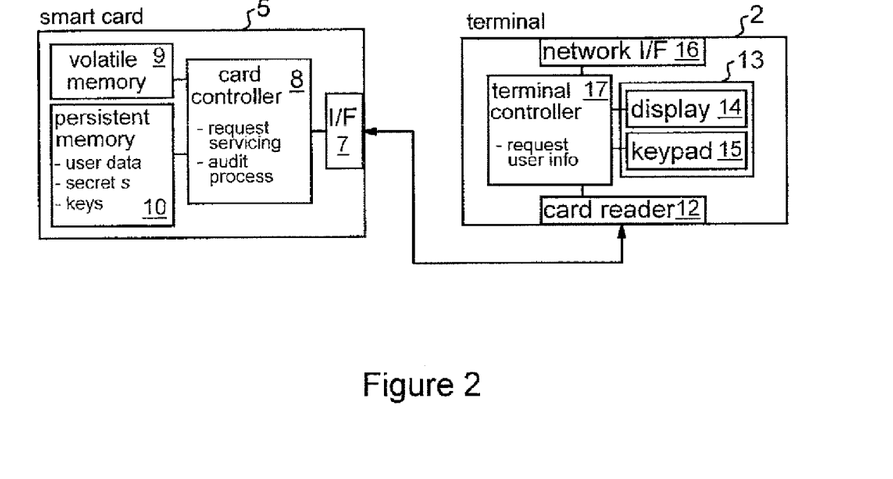
FIG. 2 is a more detailed illustration of a data security device and a terminal device of the FIG. 1 system.

FIG. 2 is schematic block diagram of the terminal device ("terminal") 2 and smart card 5 showing the main elements of these devices in more detail. Smart card 5 includes a terminal interface (I/F) 7 for transmission of data communications between the card 5 and terminal 2. Interface 7 could be implemented in general by any form of wired or wireless communications interface, but typically comprises a set of electrical contacts for engaging the terminal when the card is inserted in a card-reader slot of the terminal. Control logic in the form of card controller 8 controls operation of the card generally. Controller 8 includes functionality for servicing requests from terminal 2 and also for implementing a transaction auditing process as described in detail below. Card 5 includes volatile memory 9 for use as working memory for the various operations of controller 8. Persistent memory 10, which may comprise for example ROM and EEPROM, provides permanent storage for the user data mentioned above as well as various other data required for cryptographic processes performed in operation of controller 8. This data includes various cryptographic keys and parameters for cryptographic algorithms, as well as secret data comprising a secret value s, as discussed in more detail below.

Terminal 2 includes a security device interface, here card-reader interface 12, for communicating with card 5 via the card's terminal interface 7. The terminal 2 has a user interface 13, comprising a display 14 and a keypad 15, whereby information can be displayed to the user and the user can input information to the terminal. Terminal 2 also includes a communications interface 16 for data communications with network 3. Control logic in the form of terminal controller 17 controls operation of the terminal generally, and implements a process for requesting information from the card 5 as detailed below. Terminal controller 17 incorporates memory, not shown separately here, for storing data as required in its various operations. While in general the control logic of controllers 8, 17 could be implemented in hardware, software or a combination thereof, in this example the logic is implemented by software which configures a processor of the respective device 2, 5 to perform the functions described. Such a processor may in general comprise one or more processing chips or cores. Suitable software will be apparent to those skilled in the art from the description herein.

In this example we assume that card 5 is an eID card encoding user data in accordance with an attribute-based system described further below. The user can use the card to access a restricted service or other resource through interaction with terminal 2. In particular, access to the resource is subject to proof of some required information about the user data stored in the card. Depending on the particular application scenario, the resource may be provided by terminal 2 itself or by some other party which controls, or can communicate with, the terminal 2. Hence, terminal 2 may or may not be owned by the resource provider, and can be implemented in a variety of ways for different applications. In particular, terminal 2 may be a dedicated terminal device for a particular application or may be a general purpose device, such as a personal computer, mobile phone, PDA (personal digital assistant), etc., which can access resources provided by other devices (not shown) via network 3. The precise form of the terminal device is largely irrelevant to the operations to be described. The key point is that access to a resource is subject to proof of some required information about user data on the card, and that this proof is made through interaction between the card 5 and terminal 2. In particular, when card 5 has been connected to terminal 2 and any preliminary processing (such as input and checking of a user PIN (personal identification number)) has been completed, the terminal will send the card a request for whatever information about its user data is required to access the resource in question. The ensuing interaction between the various components of system 1 will now be described with reference to FIG. 3.

Figure 3:
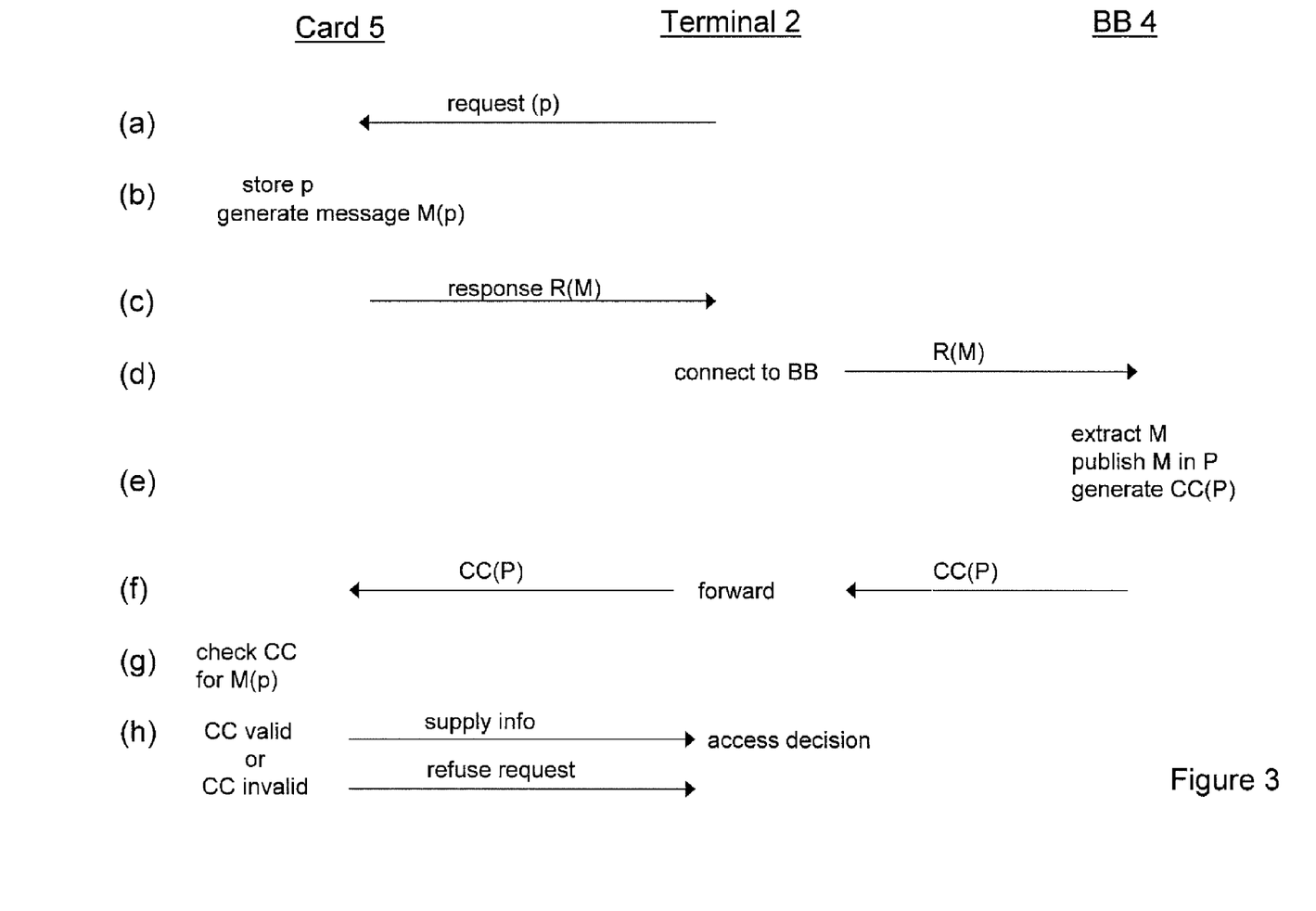
FIG. 3 illustrates interaction between devices of the FIG. 1 system following a request for information to the data security device.

FIG. 3 gives an overview of key steps performed by the card 5 (as represented by the left-hand column of the figure), the terminal 2 (represented by the central column of the figure), and the BB server (BB) 4 (represented by the right-hand column of the figure) when a request for information is issued by the terminal 2. Step (a) at the top of the figure represents sending of the request by terminal controller 17 to card controller 8 via interfaces 12, 7 of the devices. The information requested about the user data is defined here by a policy p included in the request. On receipt of the request, in step (b) of the figure, the policy p is stored by card controller 8 in volatile memory 9. Card controller 8 then generates a message M comprising an indication of the information requested by the terminal. In this embodiment this is achieved by including the policy p in the message. The message M is generated in a particular manner detailed below, and includes elements in addition to policy p, so as to permit subsequent verification that the message was M generated by card controller 8. In step (c) of the figure, the card controller sends a response R to the terminal controller 17 via interfaces 7, 12. This response comprises the message M, some elements of which are encrypted in the response as detailed below. On receipt of the response, terminal controller 17 connects over network 3 to BB server 4 via the network interface 16 of the terminal. The terminal controller then sends the response to BB server 4.

On receipt of the response in step (e) of FIG. 3, BB server 4 first extracts the message M from the response by a process detailed below. Next, the server publishes the message M via a posting P to the bulletin board. (The operation of bulletin boards is well known in the art and need not be described further here). The BB server 4 then generates a cryptographic construction (CC) encoding the published message P as detailed below. In step (f), the BB server sends the construction (CC) to the terminal device 2, and terminal controller 17 forwards the construction to card controller 8.

On receipt of the construction (CC), in step (g), card controller 8 checks that the construction is a valid construction for the original message M generated by the card controller. The ensuing action depends on validity of the construction. Only if the construction is valid does the card controller proceed in step (h) to supply the information about its user data, as specified by policy p, to the terminal device 2. In this case the terminal device then makes its access decision, and the user is either permitted or denied access to the resource accordingly. However, if the construction is not valid in step (h) then the card controller will not supply any user information and the terminal's request is refused.

Examples of protocols which can be implemented by the various devices in the FIG. 3 process will now be described in more detail. For this example, we define a set of issuers $I=\{I_1, I_2, \ldots\}$ as well as a set of attributes $A=\{a_1, a_2, \ldots\}$. Each issuer I certifies a known set of attributes $a_I \subset A$ and the possibly partial function $a_{I,U}$, mapping the attributes onto concrete values, for a user U upon the user's request. The issuer might reject such a request from U, but otherwise the transaction results in U holding a certificate $c_{I,U}$ consisting of the attributes $a_I$ and their values $a_{I,U}$, and a cryptographic signature $\sigma_{I,U}$. Any third party can verify that the signature $\sigma$ comes from I, and U will not be able to change the values signed without the signature becoming invalid.

We assume that access to a resource by the user U of card 5 requires the card controller 8 to make a proof of possession about attributes and attribute values issued by a certain issuer I. Assuming the user data stored in memory 10 of card 5 comprises a certificate $c_{I,U}$ containing the required attribute values, then the card controller 8 can issue such a proof.

The protocol to be described makes use of a policy p, an identifier of the time τ and a cryptographic challenge c. The policy p specifies which attribute values need to be released and/or what information needs to be proved about specific attribute values. The time identifier τ binds a transaction to a specific time and permits auditing of transactions within a specific time window as described below. The challenge c allows the card controller to identify its own transaction messages among those published by BB server 4. The system also employs public/private key pairs, where the key pair of an entity X consists of a public key $pk_X$, assumed to be generally known, and a secret key $sk_X$ (also called a "private key") assumed to be known to X only.

Figure 4:
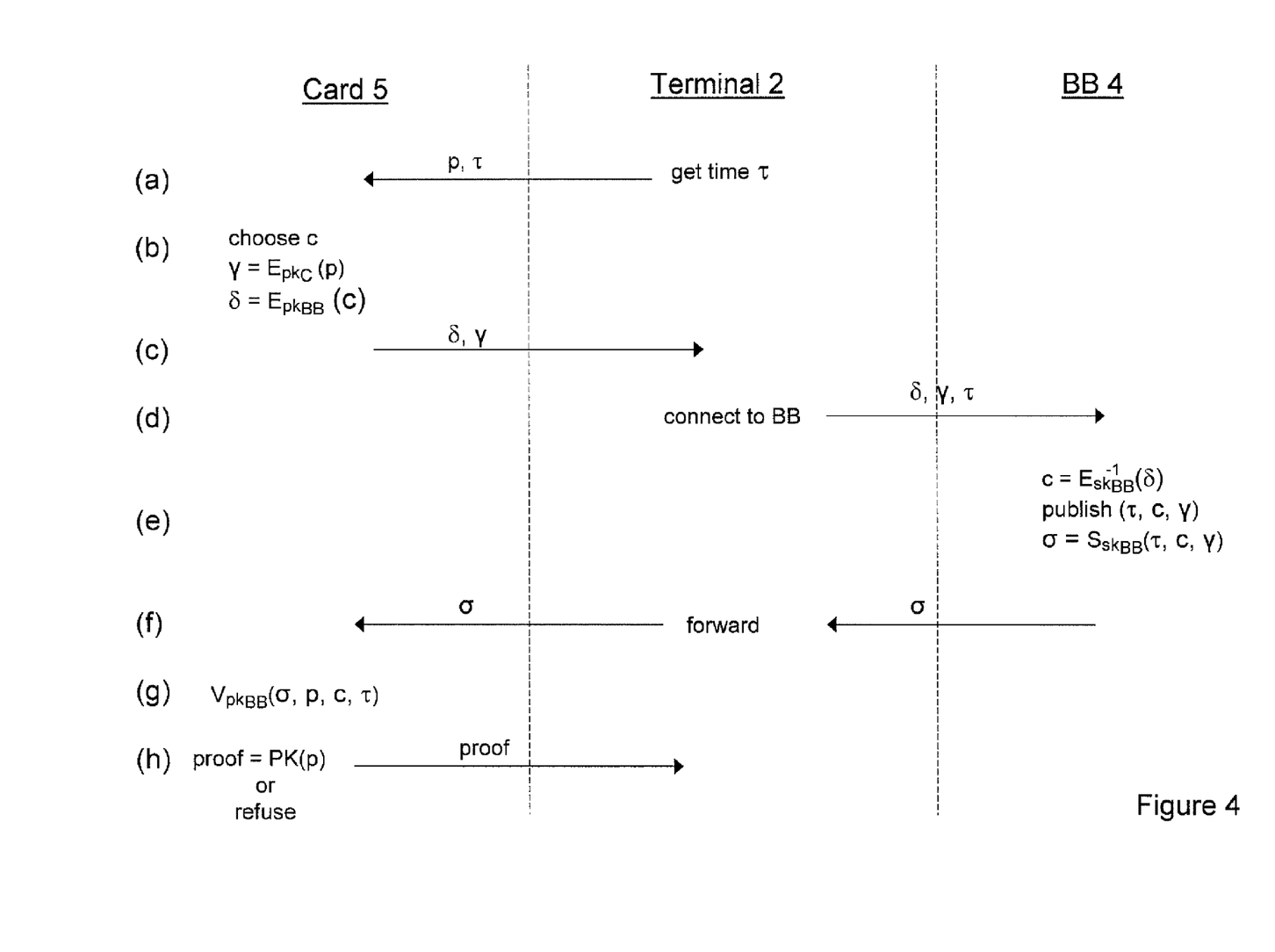
FIG. 4 illustrates key steps of the FIG. 3 process in more detail.

Operation of the system will be described with reference to the process flow diagram of FIG. 4. This corresponds generally to FIG. 3 but indicates steps of the protocol in more detail. In step (a) of the figure the terminal 2 obtains the current time τ (where it will be understood that "time" here may be real time but may be measured more generally in terms of any ordered sequence of events whereby the time indicator τ can be viewed simply as an index indicative of a particular stage in an ordered sequence of events). Suitable time sources for generating time index τ, whether implemented in terminal 2 or some other device accessible via network 3, will be apparent to those skilled in the art. The time τ is included with policy p in the request sent to card 5 as described above.

In step (b) of the figure, the message M generated by card controller 8 comprises a cryptographic challenge c, generated by a process detailed below, and a ciphertext encrypting the policy p. This uses an encryption algorithm E that takes as input the policy p and a public key $pk_C$ of a public/private key pair $pk_C$, $sk_C$ which is associated with the card and stored in persistent memory 10. The encryption algorithm produces a ciphertext $\gamma = E_{pk_C}(p)$ by encrypting p under the public key $pk_C$. There exists a decryption algorithm which uses the secret key $sk_C$, known only to card controller 8, to produce $p = E_{sk_C}^{-1}(E_{pk_C}(p))$. The encryption here is performed using a key-anonymous encryption algorithm E so that no one can link the encrypted terms. As an example, the ElGamal cryptosystem can be employed as it uses ephemeral keys. (The ElGamal system is well known to those skilled in the art and is described in "A Public Key Cryptosystem and a Signature Scheme based on Discrete Logarithms", T. ElGamal, in Advances in Cryptology: CRYPTO 1984, Volume 196 of LNCS, pages 10-18, Springer 1985). Thus, using a cyclic group G with generator g and order q, the card can store a secret z∈G and $h = g^z$. The encryption would be calculated as $E_{pk_C}(p) = (g^r, h^r \cdot p)$ where r is a randomly chosen group element.

The cryptographic challenge c and time indicator τ are stored together with policy p in volatile memory 9 of the card. The challenge is then encrypted under the public key $pk_{BB}$ of a public/private key pair $pk_{BB}$, $sk_{BB}$ which is associated with the BB server 4, producing a ciphertext $\delta = E_{pk_{BB}}(c)$. This ensures that only the genuine BB server 4 can decrypt the challenge. The response sent by card 5 to terminal 2 in step (c) of FIG. 4 comprises the two ciphertexts γ, δ as indicated. In step (d) the terminal 2 forwards to the response to BB server 4 together with the time τ associated with the request in step (a).

In step (e) the BB server first extracts the challenge c for the message via the decryption $c = E_{sk_{BB}}^{-1}(\delta)$. Server 4 then publishes τ, c, and the encrypted policy γ in a posting to the bulletin board. Next, server 4 generates a cryptographic construction encoding the publication. In particular, server 4 uses a signature generation algorithm $S_{sk'_{BB}}(\tau, c, \gamma)$ to sign the publication under a secret BB signature key $sk'_{BB}$ to produce a signature σ. (Note that the signature key pair of BB 4 is different to the encryption key pair mentioned above). The signature σ is then sent back to card 5 in step (f).

In step (g) the card controller verifies the validity of the signature for the policy p, challenge c, and time τ stored for the request in volatile memory 9. This uses a signature verification algorithm $V_{pk'_{BB}}$ which uses the public key $pk'_{BB}$ corresponding to signature key $sk'_{BB}$ to decode the signature. The verification algorithm returns true if and only if the publication (τ, c, γ) contains the same values for the challenge c, and time τ stored in memory 9 for the request, and the ciphertext γ decodes under secret key $sk_C$ to the identical policy p stored in memory 9. Thus, card 5 will verify the credential σ as valid only if it is a valid signature on the correct time τ and the message (γ, c) originally generated by the card. Under the trust assumption for BB server 4, this proves that the original message containing policy p has been correctly published to the bulletin board. Also, verification of the signature ensures that the time τ provided to the BB in step (d) was the same as that supplied to the card in step (a). (In addition, if the BB server is adapted to check the time τ for correctness, the correctness of the time used can be ensured). If the signature is valid, in step (g) the card controller 8 implements the required proof of knowledge PK(p) about the user attributes in user certificate $c_{I,U}$ according to the policy p, thereby supplying the information requested about the user data to terminal 2.

Figure 5:
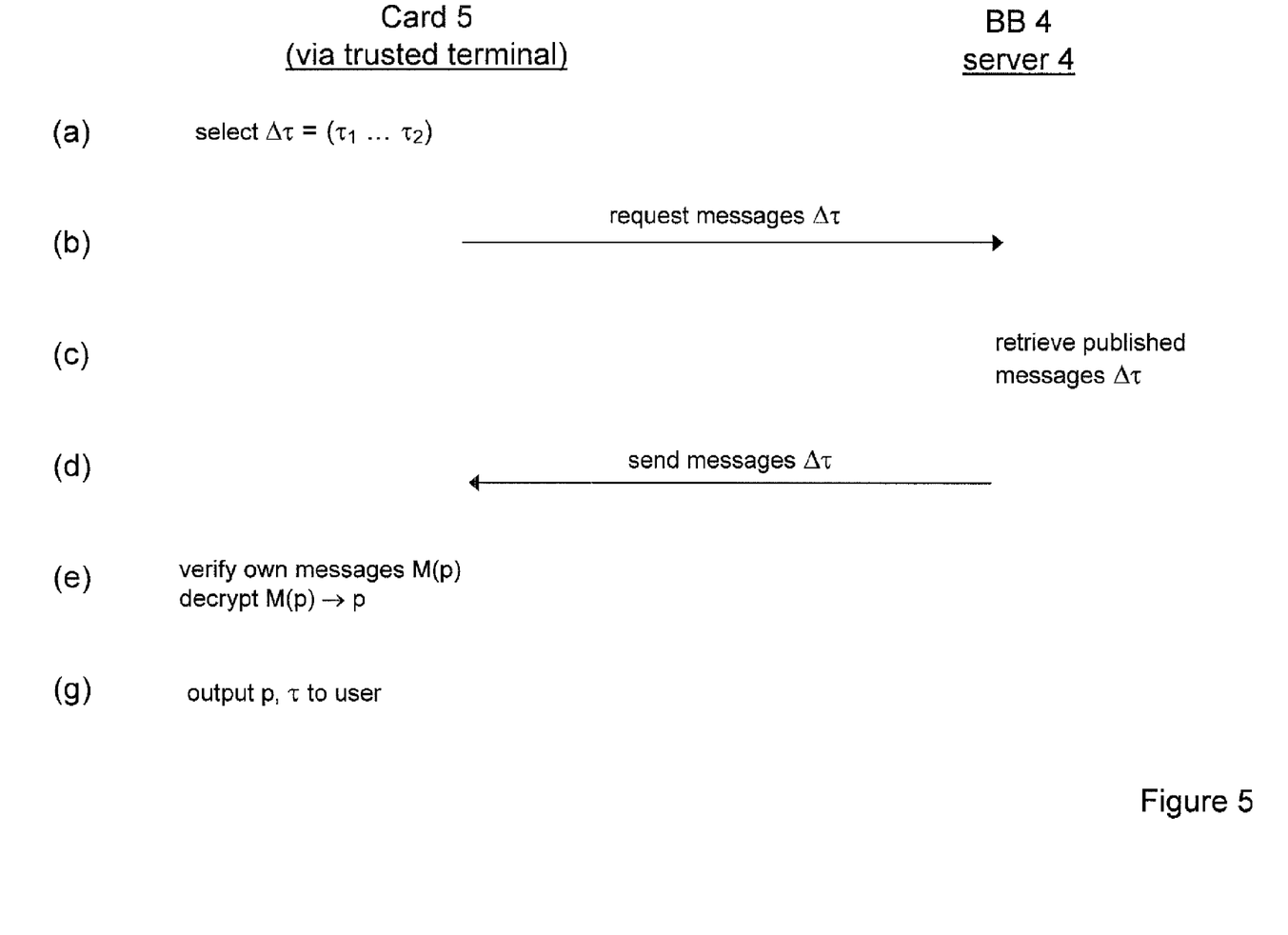
FIG. 5 illustrates interaction between devices of the FIG. 1 system during an audit process performed by the data security device.

It will be seen that the system described enables card controller 8 to be sure that the policy p, defining the information requested by terminal 2, is published to the trusted bulletin board before the information requested is actually supplied to the terminal 2. Moreover, at any time after the transaction with terminal 2, the user can take the card 5 to a trusted terminal to retrieve the policy p. This allows the user to check whether that policy complied with the one communicated to the user via terminal display 14 during the transaction. FIG. 5 gives an overview of basic steps of this audit process. The figure shows the interaction between the card 5 (via the trusted terminal), represented by the left-hand column of the figure, and the BB server 4 represented by the right-hand column of the figure. For this highly practical implementation, in step (a) of the process the user selects a time window for which the audit process is performed. The audit process will then be limited to messages published by BB server 4 in that time window. The time interval is selected by the user with the aid of the trusted terminal and is represented in the figure by $\Delta\tau = (\tau_1 \ldots \tau_2)$. In step (b), card controller 8 sends a request to BB server 4 via the trusted terminal for BB publications $(\tau_i, c_i, \gamma_i)$ containing times τ in the specified time interval Δτ. BB server 4 retrieves the relevant publications $(\tau_i, c_i, \gamma_i)$, containing messages $(c_i, \gamma_i)$, in step (c) and sends these to the card 5 in step (d). Next, in step (e), card controller 8 identifies from the returned publications any messages $(c_i, \gamma_i)$ which were generated by controller 8. The card controller can verify which of the messages it generated itself using the secret value s stored in persistent memory 10 of the card. This is explained in more detail below. For each message so identified, the controller 8 then decrypts the ciphertext $\gamma_i$ in step (f) to obtain the policy $p_i$ encoded therein. The resulting policy $p_i$ and associated time $\tau_i$ are then displayed to the user via the terminal. The user can thus review the audit trail of his transactions with previous terminals, and check that no more information was disclosed than that revealed by the terminal at the time. Discrepancies can thus be identified and rogue terminals reported to an appropriate authority.

Particular techniques enabling verification of authorship of messages by card controller 8 will now be described. These techniques enable the verification process to be performed without requiring the card to write any data to its persistent memory 10. That is, between a given transaction involving generation of a message which is published to BB 4 and the subsequent audit process in which that message is identified by card controller 8, no message-specific data (such as the challenge c or even a counter) need be retained by card 5. As a consequence of not using any persistent storage, the card controller needs to do some calculations when retrieving information from the bulletin board. Two strategies will be explained which allow the card controller to calculate the challenge c such that it can identify its own messages among BB publications without allowing other parties to link different transactions of the same device.

The first technique makes use of a relatively small, randomly chosen number $r \in \{0,1\}^h$, the fixed secret value s stored in card memory 10, and a verifiable random function (VRF) such as $f(x)=g^{1/(x+s)} \pmod{v}$, where g is a generator of a group G with prime order v as defined in "A verifiable random function with short proofs and keys", Y. Dodis and A. Yampolskiy, in Public Key Cryptography '05, volume 3386 of LNCS, pages 416-431, Springer, 2005. Card controller 8 computes the challenge with $c=f(r)=g^{1/(r+s)} \pmod{v}$. To verify its authorship of a published message $(c_i, \gamma_i)$, controller 8 computes $c_j=f(r_j)$ for all possible choices $r_j \in \{0,1\}^h$. In step (e) of FIG. 5, the controller 8 can compare all the possible challenge values $c_j$ with the challenges received in messages published on the BB. The rationale in this solution is to map a small number of (randomly chosen) values onto a large message space. The parameters are selected so that: (1) the probability is small of card controller 8 choosing the same r during its lifetime (or at least a long time span compared to the number of transactions); and (2) the probability of two different card controllers generating the same c is negligible. (However, to allow for the possibility of collisions occurring, a checksum in the policy can be used to identify wrongly decrypted policies which are to be eliminated).

The second technique involves computation of the challenge c for a message such that the challenge comprises a pair of values which are dependent on a random number r and which have a predetermined relationship dependent on the fixed secret value s. In the audit process, messages $(c_i, \gamma_i)$ generated by the controller are identified by identifying any challenge $c_i$ comprising a pair of values having the required relationship. In more detail, card controller 8 computes the challenge by choosing a random number with $g \in_R G$ and using the stored secret s to compute $g^s$. The challenge c is set to $c=(g, g^s)$. In the audit process, the controller 8 can download each $c=(g, g')$ in the publications and, in step (e) of FIG. 5, compute $g^s$. All published messages with $g'=g^s$ originate from card controller 8. In both this and the first technique, the message space that the secret s is taken from is large enough that different cards are very unlikely to use the same secret.

It will be seen that the above system allows data security devices like smart card 5, with strictly limited write cycles to persistent memory and no I/O capabilities, to attain a reliable audit trail for transactions with untrusted terminals 2. This audit trail is private to the card user and does not therefore require trust in any independent auditor's privacy promises. The card user can be certain that a policy defining requested user information has been published before the information is actually supplied to a terminal. In addition, the user can retrieve and check the published policy without any other party being able to identify the user or even link different transactions of the same user. Rogue terminals requesting more data than they actually reveal can thus be identified and reported, providing an effective deterrent to terminal fraud. For secure operation, the system requires only a trusted BB 4 and user access to a trusted terminal for the audit process. Even the trusted BB server does not learn anything about user transactions (i.e., either the parties or the information exchanged). The protocol does not require the data security device to permanently store any information about individual transactions. The computations required when retrieving the audit trail occur at a time when reaction time is much less critical than during the transaction itself. The transaction protocol of FIG. 4 guarantees that there has not been a power failure between the first part of the transaction and the verification performed in step (g). As a result, the card controller can perform pre-computations that are policy independent, and such pre-computation can significantly reduce the time a user has to wait for the final proof to be completed in step (h) of FIG. 4. This can be very important to comply, for example, with expectations for eID card systems.

While the data security device is a smart card above, numerous other forms of data security device can be envisaged including, in general, any form of data-bearing hardware token. Further, while an attribute-based system has been described for encoding user data above, other systems might of course be employed in embodiments of the invention. Many other changes and modifications can be made to the exemplary embodiments described without departing from the scope of the invention.

The invention claimed is:

1. A method for processing requests for information at a security device, said security device having a controller device and an associated memory storage device for storing user data, the controller performing processing of a received request by:

generating a message comprising an indication of the information requested about the user data, the message being generated so as to permit verification, using secret data, that the message was generated by the controller;

sending the message to a terminal device for communication via a network to a publication entity for publication of the message in the network;

receiving from the terminal device a cryptographic construction, issued by the publication entity, encoding the message published by the publication entity;

checking validity of the cryptographic construction for said message generated by the controller; and     supplying the information requested about the user data to the terminal device in dependence on said cryptographic construction,     wherein said generating a message further comprises:

encrypting said indication of the information requested about the user data to produce a ciphertext which is decryptable using a secret user key, the encrypting of said indication being in accordance with a key-anonymous encryption system.

2. The method as claimed in claim 1, further comprising:
supplying, by the controller, the information requested about the user data to the terminal device only if the cryptographic construction is valid for said message generated by the controller.

3. The method as claimed in claim 1 further comprising:
performing, by said controller, an audit process comprising:
receiving via the terminal device message data from messages published by the publication entity in the network;
identifying from said message data any message generated by the controller among the published messages corresponding to said message data; and
for each message so identified, sending to the terminal device for output to a user a description of the information requested about the user data corresponding to said indication in that message.

4. The method as claimed in claim 3, further comprising:
computing for each message generated by said controller, a cryptographic challenge to facilitate verification that the message was generated by the controller, and including the cryptographic challenge in that message.

5. The method as claimed in claim 4, further comprising:
encrypting, by said controller, the cryptographic challenge in a message using a public key of a public/private key pair associated with the publication entity.

6. The method as claimed in claim 4, wherein the computing a cryptographic challenge comprises:
using a random number for that message and a predetermined secret value so as to permit verification using said secret value that the message was generated by the controller without intervening storage by the device of any message-specific data.

7. The method as claimed in claim 6, wherein said performing an audit process comprises:
receiving, via the terminal device, said cryptographic challenges from messages published by the publication entity; and
identifying from said challenges any message generated by the controller by comparing said challenges with all possible challenges computed by the controller using a random number and the predetermined secret value.

8. The method as claimed in claim 6, wherein the computing a cryptographic challenge for a message comprises:
computing the cryptographic challenge to include a pair of values which are dependent on said random number and which have a predetermined relationship dependent on said secret value; wherein said performing said audit process comprises:
receiving via the terminal device cryptographic challenges from messages published by the publication entity, and
identifying from said challenges any message generated by the controller by identifying any challenge comprising a pair of values having said predetermined relationship.

* * * * *